United States Patent
Kondoh et al.

(10) Patent No.: US 7,669,192 B2
(45) Date of Patent: Feb. 23, 2010

(54) METHOD TO FIND A VIOLATION OF A CODING RULE IN PROGRAM

(75) Inventors: Goh Kondoh, Tokyo (JP); Shinichi Hirose, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 11/555,144

(22) Filed: Oct. 31, 2006

(65) Prior Publication Data
US 2007/0169020 A1     Jul. 19, 2007

(30) Foreign Application Priority Data
Oct. 31, 2005    (JP) .............................. 2005-317204

(51) Int. Cl.
*G06F 9/44* (2006.01)
(52) U.S. Cl. ...................................... 717/144; 717/126
(58) Field of Classification Search ................. 717/126, 717/143, 144
See application file for complete search history.

(56) References Cited

U.S. PATENT DOCUMENTS

2005/0166193 A1* 7/2005 Smith et al. .................. 717/143
2006/0080578 A1* 4/2006 Thiagarajan et al. .......... 714/38
2007/0083933 A1* 4/2007 Venkatapathy et al. ........ 726/25

FOREIGN PATENT DOCUMENTS

JP     10-187450    7/1998

OTHER PUBLICATIONS

Eitan Farchi and Bradley R. Harrington, "Assisting the Code Review Process Using Simple Pattern Recognition," IBM, Oct. 21, 2005, (15 pages).*
Tomoko Matsumura et al., A Method for Detecting Fault Caused by the Violation of Implicit Coding Rules, vol. 44, No. 4, pp. 1070-1082 (Apr. 15, 2003).
Mariko Oda et al., Pitfall Detection of C Programs Using Pattern Matching, vol. 35, No. 11, pp. 2427-2436 (Nov. 15, 1994).

* cited by examiner

*Primary Examiner*—Eric B Kiss
(74) *Attorney, Agent, or Firm*—Ken Corsello; Shimokaji & Associates P.C.

(57) ABSTRACT

An apparatus for determining whether or not a program violates a convention, including an input unit for receiving an input of a target program to be an object of a determination on whether to violate the convention; a violation storing unit for beforehand storing any one of an abstract syntax tree and a pattern which indicate a structure of a program violating the convention; a converter for converting the abstract syntax tree of the target program to a conversion tree with a predetermined conversion rule; and a determination unit for determining that the target program violates the convention on condition that at least a part of the conversion tree agrees with an abstract syntax tree violating the convention.

1 Claim, 7 Drawing Sheets

105

| CONVERSION RULE | |
|---|---|
| SYMBOL | CONTENTS |
| taj | RECONFIGURE JOIN OF THREE TABLES WITH JOIN RULE |
| tmj | REVERSE SEQUENCE OF SELECTION AND MAP TO JOIN |
| txj | ASSIGN SELECTION CONDITION TO TWO SELECTION COMMANDS |
| ⋮ | ⋮ |

| ID | VIOLATION INFORMATION | MODIFICATION METHOD |
|---|---|---|
| $r_1$ | USE ASTERISK (*) IN COLUMN NAME LIST OF SELECT | — |
| $r_2$ | DESCRIBE WITH SUBQUERY IN CASE OF BEING DESCRIBABLE WITH SUBQUERY OR JOIN | DESCRIBE WITH JOIN |
| $r_3$ | JOIN FOUR OR MORE TABLES | — |
| $r_4$ | OUTER JOIN AND SELECT | SELECT AND OUTER JOIN |
| $r_5$ | JOIN SAME TABLE WITH SAME KEY | MODIFY TO TABLE |
| $r_6$ | GENERATE TABLE HAVING NO AFFECT ON FINAL RESULT | — |
| ⋮ | ⋮ | ⋮ |

| VIOLATION INFORMATION ID | CONVERSION RULE ID | FALSE DETECTION PATTERN |
|---|---|---|
| $r_1$ | taj | false |
| $r_1$ | tmj | false |
| ⋮ | ⋮ | ⋮ |
| $r_2$ | taj | false |
| $r_2$ | tmj | false |
| ⋮ | ⋮ | ⋮ |
| $r_3$ | taj | false |
| $r_3$ | tmj | true |
| ⋮ | ⋮ | ⋮ |
| $r_5$ | taj | false |
| $r_5$ | tmj | false |
| ⋮ | ⋮ | ⋮ |

FIG. 3b

```
1:  SELECT HR2.EMPLOYEENO, HR2.KANJINAME, HR2.DEPTNAME_1, HR2.POSTNAME_1
2:  FROM
3:      (SELECT HR1.USERID, HR1.KANA_REFERENCE_NM,
4:             EM.MDKANA_REFERENCE_NM, BO.DEPT_KANA_NM
5:      FROM
6:          ( COMPASHRPROFILE AS HR1 LEFT JOIN TM_CR_EMPLOYEE_INFO AS EM
7:            ON HR1.EMPLOYEENO = EM.EMPLOYEE_NO )
8:          INNER JOIN
9:          TM_CR_BO_PRESENT_INFO AS BO ON HR1.DEPTCODE_1 = BO.DEPT_CD
10:     ) AS JT
11:
12:     INNER JOIN            PART CORRESPONDING TO SUBTREE s1 TO BE CONVERTED
13:     COMPASHRPROFILE AS HR2 ON HR2.USERID = JT.USERID
14: WHERE HR2.C_BOCODE_1 = ?
15:     AND HR2.EMPLOYEENO <> ?
16:     AND JT.DEPT_KANA_NM LIKE ?
17:     AND ( JT.KANA_REFERENCE_NM LIKE ? OR JT.MDKANA_REFERENCE_NM LIKE ? )
```

FIG. 6

```
1:  SELECT HR2.EMPLOYEENO, HR2.KANJINAME, HR2.DEPTNAME_1, HR2.POSTNAME_1
2:  FROM
3:      SELECT HR1.USERID, HR1.KANA_REFERENCE_NM,
4:             EM.MDKANA_REFERENCE_NM, BO.DEPT_KANA_NM
5:      FROM
6:          (( COMPASHRPROFILE AS HR1 LEFT JOIN TM_CR_EMPLOYEE_INFO AS EM
7:             ON HR1.EMPLOYEENO = EM.EMPLOYEE_NO )
8:          INNER JOIN
9:          TM_CR_BO_PRESENT_INFO AS BO ON HR1.DEPTCODE_1 = BO.DEPT_CD
10:     ) AS JT
11:     INNER JOIN            PART CORRESPONDING TO SUBTREES s2 TO s19 TO BE CONVERTED
12:     COMPASHRPROFILE AS HR2 ON HR2.USERID = JT.USERID
13: WHERE HR2.C_BOCODE_1 = ?
14:     AND HR2.EMPLOYEENO <> ?
15:     AND JT.DEPT_KANA_NM LIKE ?
16:     AND ( JT.KANA_REFERENCE_NM LIKE ? OR JT.MDKANA_REFERENCE_NM LIKE ? )
17: ORDER BY JT.KANA_REFERENCE_NM, JT.DEPT_KANA_NM, HR2.USERID
```

FIG. 7

METHOD TO FIND A VIOLATION OF A CODING RULE IN PROGRAM

CROSS-REFERENCE TO RELATED APPLICATIONS

This application claims priority under 35 U.S.C. § 119 to Japanese Patent Application No. 2005-317204 filed Oct. 31, 2005, the entire text of which is specifically incorporated by reference herein.

BACKGROUND OF THE INVENTION

The present invention relates to an apparatus for, and a method of, determining whether or not a program violates a convention. Specifically, the present invention relates to an apparatus for, and a method of, determining whether or not a program violates a convention by use of an abstract syntax tree indicating a structure of the program.

In development of a program, there is a case where a convention, such as a method of using the API, is set up in order to enhance the operational efficiency and maintainability. For the purpose of determining whether or not the program violates this convention, the following technique has been heretofore used (see "Rational Code Review" "codereview.lexma.ibm.com", for example). In the case of this technique, a pattern of an abstract syntax tree indicating a structure of a program violating the convention is beforehand prepared, and thus the pattern is compared with an abstract syntax tree of a program to be an object of a determination.

However, programs to be developed are various in type, and structures respectively violating conventions are also various in type. This makes it extremely difficult to beforehand prepare all the abstract syntax trees respectively indicating structures of programs violating conventions. In addition, a false detection, a failure in detection, and the like are prone to be caused. Moreover, a technique has been proposed, with which a defect in a program is detected without use of an abstract syntax tree (see "FindBugs", "findbups.sourceforpe.net" for example). In the case of this technique, a control flow and a data flow are analyzed by scanning byte codes of the Java language or the like. Subsequently, parts incapable of being executed in the program are detected, and a user is informed of the parts. In the case of this technique, however, specialized knowledge is needed for implementing a process for analyzing the control flow and the like. As a result, this technique makes it possible to detect only a defect which a specialist in the program language has beforehand expected, and makes it impossible for a person in charge of the project to add or modify a convention depending on the necessity.

BRIEF SUMMARY OF THE INVENTION

With this taken into consideration, an aspect of the present invention is to provide an apparatus, a method, and a program, which make it possible to solve the foregoing problems. This object is attained with combination of characteristics described in independent claims in the scope of claims. In addition, dependent claims specify more advantageous specific examples of the present invention.

For the purpose of solving the foregoing problems, the present invention provides an apparatus for determining whether or not a program violates a convention, a method of determining whether or not the program violates the convention by use of the apparatus, and a program causing an information processing system to function as the apparatus. The apparatus includes an input unit for receiving an input of a target program to be an object of a determination on whether to violate the convention; a violation storing unit for beforehand storing violation information made up of any one of an abstract syntax tree and a pattern which indicate a structure of a program violating the convention; a converter for converting the abstract syntax tree of the target program to a conversion tree with a predetermined conversion rule; and a determination unit for determining that the target program violates the convention on condition that at least a part of the conversion tree agrees with any one of the abstract syntax tree and the pattern which violate the convention.

It should be noted that the foregoing outline of the present invention does not enumerate all of the characteristics necessary for the present invention, and that sub-combinations of these characteristic groups can also constitute the present invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

FIG. 2 shows an example of a data structure in a conversion rule storing unit 105.

FIG. 3a shows pieces of violation information and modification methods corresponding thereto, which are stored in a violation storing unit 130.

FIG. 3b shows false detection patterns stored in the violation storing unit 130.

FIG. 6 shows an example of the target program.

FIG. 7 shows an example of a program expressed with a conversion tree obtained by converting an abstract syntax tree of the target program.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
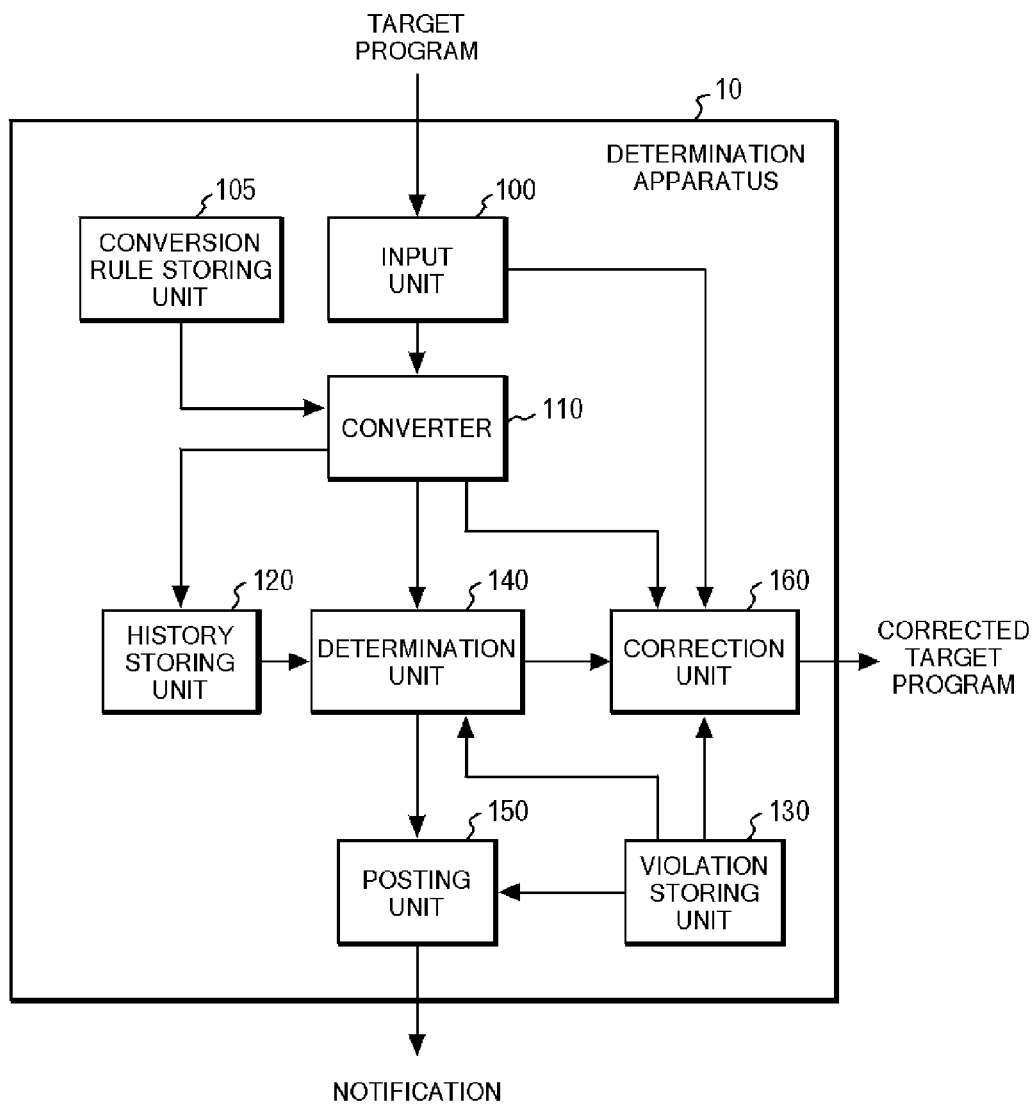
FIG. 1 shows a functional configuration of a determination apparatus 10.

FIG. 1 shows a functional configuration of a determination apparatus 10. An object of the determination apparatus 10 is to efficiently determine whether or not a program violates a convention. The convention violation to be checked on in this example includes not only a syntax error in a program but also violation of a convention set up locally in a project for developing the program and a library in which the program is incorporated. If a program is checked on with such a convention and thus a program violating the convention is beforehand corrected, this makes it possible to effectively execute the program, and to accordingly improve efficiency in which software is developed and operated.

The determination apparatus 10 includes an input unit 100, a conversion rule storing unit 105, a converter 110, a history storing unit 120, a violation storing unit 130, a determination unit 140, a posting unit 150 and a correction unit 160. The input unit 100 receives an input of a target program to be an object of a determination on whether to violate a convention. The conversion rule storing unit 105 stores a plurality of predetermined conversion rules. Out of the plurality of conversion rules, the converter 110 selects a plurality of combinations consisting of one or more conversion rules. Thus, the converter 110 sequentially applies each of the conversion rules included in each of the combinations to an abstract syntax tree (AST) of the target program, and thereby generates each of a plurality of conversion trees.

Each time the abstract syntax tree is converted by the converter 110, the history storing unit 120 stores a subtree of the pre-converted abstract syntax tree and a subtree of the post-converted conversion tree while associating the two subtrees with each other. The violation storing unit 130 beforehand stores violation information indicating a structure of a program violating a convention while associating the violation program with each of the plurality of conventions. In addition, the violation storing unit 130 stores a modification method of modifying a program violating the conventions to a program in a format causing the program not to violate the conventions while associating the modification method with each of the plurality of conventions. Moreover, the violation storing unit 130 stores a tuple of a conversion rule and a convention, with which a post-converted conversion tree is falsely detected as violating the convention, as a false detection pattern.

The determination unit 140 determines that the target program violates a convention on condition that at least a part of a structure of at least one of the plurality of generated conversion trees agrees with any one piece of violation information. Incidentally, in a case where a structure of the abstract syntax tree itself of the target program agrees with any one piece of violation information, the determination unit 140 also determines that the target program violates the convention. In addition, even in a case where a structure of a conversion tree generated by the conversion agrees with any one piece of violation information, the determination unit 140 determines that the target program does not violate the convention on condition that a tuple of the conversion rule concerning the conversion and the convention corresponding to the piece of violation information is a false detection pattern.

On condition that it has been determined that the target program violates the convention, the posting unit 150 informs a user of a modification method corresponding to the conventions. Furthermore, on condition that the target program violates the convention, the posting unit 150 may inform a user of a program expressed with a conversion tree with a structure not agreeing with the violation information stored in the violation storing unit 130, out of the conversion trees generated by the conversion by the converter 110. Moreover, in this case, on condition that the target program violates the convention, and on condition that the conversion from the abstract syntax tree indicating the target program to the informed conversion tree is an equivalent conversion, the correction unit 160 may correct at least a part of the target program to a structure indicated by the conversion tree. The corrected target program is outputted for the user.

FIG. 2 shows an example of a data structure in the conversion rule storing unit 105. The conversion rule storing unit 105 stores each of the plurality of conversion rules, with which the abstract syntax tree is converted to a conversion tree, while associating the conversion rule with a symbol with which the convention rule is identified. Hereinafter, it is supposed that a procedure for accessing a database is described in the target program. More specifically, it is supposed that the target program is described with the data manipulation language (DML) of the structured query language (SQL). In addition, it is supposed that each of the conversion rules is a rule for converting the abstract syntax tree of the target program described with the SQL to the conversion tree.

Specifically, a conversion rule taj indicates a conversion for reconfiguring a join command for joining three tables, included in the database, with the associative law. This conversion rule is, for example, a rule for converting the following abstract syntax tree to the following conversion tree. The abstract syntax tree indicates performing arithmetic on a third term and a result of doing arithmetic on first and second terms. The conversion tree indicates performing arithmetic on the first term and a result of doing arithmetic on the second and third terms.

In addition, a conversion rule tmj is a rule for converting the following abstract syntax tree to the following conversion tree. The abstract syntax tree is that of a program for selecting a row or column from a table in the database, and for joining the selected row or column to another table therein. The conversion tree is that of a program for joining the table in the database to another table therein, and for selecting a row or column from a table obtained by this join.

Moreover, a conversion rule txj indicates a conversion for assigning a condition for selecting a row to two selection commands. For example, the conversion rule txj is a rule for converting the following abstract syntax tree to the following conversion tree. The abstract syntax tree is that of a program for selecting a row which satisfies first and second conditions from a table in the database. The conversion tree is that of a program for selecting a row which satisfies the first condition from the table, and for further selecting a row which satisfies the second condition from an intermediate table obtained as a result of the selection.

In this respect, it is desirable that each of the plurality of conversion rules stored in the conversion rule storing unit 105 should be a conversion rule which can no longer apply the conversion rule to a part of a subtree, obtained by the conversion by use of the conversion rule, in the conversion tree obtained by the conversion. In other words, it is desirable that a set of the conversion rules should be set up in order that the conversion tree cannot be extended endlessly by an endless application of the same single conversion rule. This makes it possible to terminate the process by the converter 110 in a finite time, and accordingly to easily apply the determination apparatus 10 to realistic intended uses.

On the other hand, even in a case where the conversion rules do not satisfy the foregoing nature, the converter 110 may terminate the sequential application of the plurality of conversion rules on condition that a predetermined time passes after the conversion rules start to be sequentially applied to the abstract syntax tree, or on condition that the application is completed a predetermined number of times. By use of this method, the process by the converter 110 is also capable of being terminated in the finite time. It is more desirable that, in a case where a conversion tree which is the same as the already-generated conversion tree is generated, the converter 110 completes applying the conversion rules to the conversion tree. This makes it possible to prevent a redundant conversion which is unnecessary for determining whether to violate a convention, and to accordingly enhance the operational efficiency.

FIG. 3a shows pieces of violation information and modification methods corresponding thereto, which are stored in the violation storing unit 130. The violation storing unit 130 stores each piece of violation information while associating the piece of violation information with its identification (ID) and a modification method corresponding thereto. A piece (r1) of violation information indicates that a case where an asterisk (*) is used in a column name list on a SELECT command in the SQL constitutes violation of a convention. A piece (r2) of violation information indicates that, in a case where the description is capable of being made with any one of a subquery and a join of the SQL, the description with the subquery constitutes violation of a convention.

A piece (r3) of violation information indicates that a case where the number of tables to be joined to one another with a join command is not smaller than a predetermined number (for example, four) constitutes violation of a convention. The setting of this convention violation makes it possible to prevent the data size of the post-joined tables from becoming vast. Incidentally, one may consider that, even in a case where a plurality of tables are joined to one another, if a specific row is selected from the plurality of tables and thereafter the post-selected table is further joined to another table, the data size of the post-joined tables becomes smaller. For this reason, preferably, the piece (r3) of violation information may be information with which it is determined that a case where the total number of tables consecutively joined to one another without executing the SELECT command is not smaller than a predetermined number constitutes violation of a convention.

A piece (r4) of violation information indicates that a program which outer-joins a table to another table, and which thereafter selects a record from the joined table, constitutes violation of a convention. In addition, a piece (r5) of violation information indicates that a program which joins a plurality of mutually-equal tables to one another with a single key constitutes violation of a convention. Furthermore, a piece (r6) of violation information indicates that a program which generates a table having no affect on a final result constitutes violation of a convention.

In the case of the example shown in FIG. 3a, each pieces of violation information is expressed as a sentence indicating its contents. Actually, each pieces of violation information may be not only an abstract syntax tree itself of a typical program which does not observe a convention, but also a pattern indicative of that. In addition, the determination unit 140 may determine whether or not the abstract syntax tree agrees with the pattern. More specifically, this pattern may be described with a predetermined script language or a predetermined program language. As a specific example, this pattern may be described with the XPath (XML Path Language) or the Java (registered trade mark) language.

Moreover, the violation storing unit 130 stores a modification method of modifying a program for the purpose of eliminating a convention violation indicated by each piece of violation information while associating the modification method with the piece of violation information. For example, the violation storing unit 130 stores a modification method of modifying a program capable of being described with any one of a subquery and join in order that the program may be described with the join while associating the modification method with the piece (r2) of violation information. Moreover, the violation storing unit 130 stores a modification method of modifying a program for making an outer join and a subsequent selection to a program for making a selection and a subsequent outer join while associating the modification method with the piece (r4) of violation information. Furthermore, the violation storing unit 130 stores a modification method of modifying a program for joining the same tables to one another with a single key to a mere table while associating the modification method with the piece (r5) of violation information.

In FIG. 3a, each of these methods is expressed as a sentence indicating its contents, as in the case of each pieces of violation information. Actually, each of these methods may be in the form of a conversion program for converting the target program. This conversion program may be described with any one of various script languages and program languages.

Examples of conversion rules and pieces of violation information have been shown above. For the purpose of detecting all the convention violations, however, an administrator needs to select a variety of conversion rules and various pieces of violation information for efficiently detecting the convention violations. In some cases, conversion rules extremely prone to generate structures agreeing with the violation information are included in such a variety of conversion rules. In such a case, if it is determined that all of them constitute the convention violation in a case where the conversion rules have structures each agreeing with the violation information, the violation information and the conversion rules have to be set up through extremely careful consideration. This unintentionally causes inconvenience on the administrator. By contrast, in the case of this example, the violation storing unit 130 further stores tuples of conversion rules and conventions, each of which causes post-converted conversion trees to be falsely detected as violating a convention, as false detection patterns. In addition, in a case where a conversion tree agreeing with one of the false detection patterns is detected, the conversion tree is treated as an exception to the convention violations, or as not violating a convention. Descriptions will be provided below for specific examples of such false detection patterns.

FIG. 3b shows false detection patterns stored in the violation storing unit 130. The violation storing unit 130 further stores the tuples of conversion rules and conventions, each of which causes post-converted conversion tree to be falsely detected as violating a convention, as the false detection patterns. In the example shown in this figure, the violation storing unit 130 stores the tuples of conversion rules and conventions, which correspond to the false detection patterns, while associating the tuples respectively with flags true indicating the false detection patterns. A tuple of the piece ($r_3$) of violation information and the conversion rule ($t_{mj}$) is stored while associating the tuple with a flag true indicating one of the false detection patterns. For this reason, even in a case where a conversion tree obtained by the conversion with the conversion rule ($t_{mj}$) corresponds to the piece ($r_3$) of violation information, the determination unit 140 does not determine that the target program violates the convention. In other cases, if the conversion tree agrees with a structure indicated by any one piece of violation information, it is determined that the conversion tree violates the convention.

Figure 4:
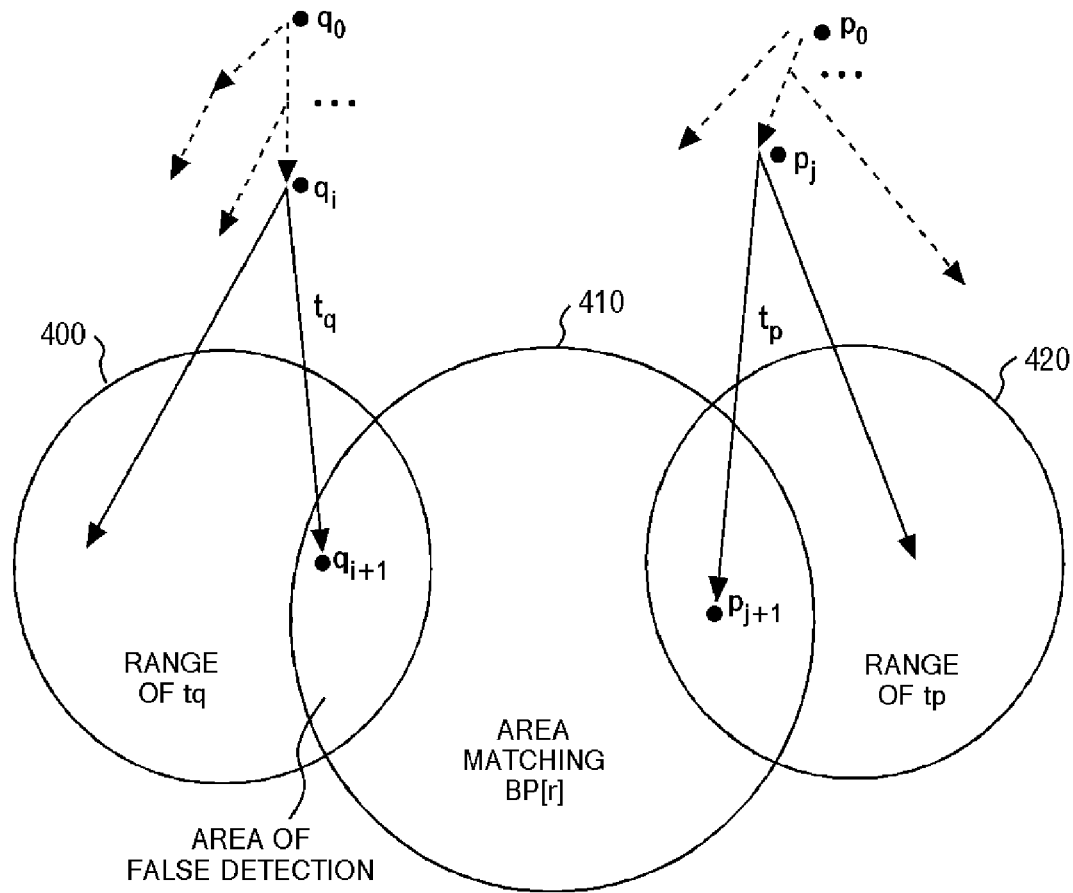
FIG. 4 shows an example of a conversion that triggers a false detection.

FIG. 4 shows an example of a conversion which triggers a false detection. In FIG. 4, a set 410 is a set of abstract syntax trees each including a structure agreeing with a piece ($r_0$) of violation information. In addition, a set 400 is a domain of a conversion rule ($t_q$), or a set of conversion trees obtained by the conversion with this conversion rule. Furthermore, a set 420 is a domain of a conversion rule ($t_q$), or a set of conversion trees obtained by the conversion with this conversion rule. An abstract syntax tree $q_i$ is converted to a conversion tree $q_{i+1}$ with the conversion rule $t_q$. This conversion tree $q_{i+1}$ is included in the set 410. In other words, this conversion tree $q_{i+1}$ has a structure agreeing with the violation information. Furthermore, an abstract syntax tree $p_j$ is converted to a conversion tree $p_{j+1}$ with the conversion rule $t_p$. This conversion tree $p_{j+1}$ is included in the set 410.

In this respect, both the conversion tree $q_{i+1}$ and the conversion tree $p_{j+1}$ are included in the set 410. For this reason, in a case where the convention violation is intended to be checked on with the violation information only, it is determined that both $q_0$ and $p_0$ are programs violating the respective conventions. In contrast, in a case where an administrator wishes to treat this conversion tree $q_{i+1}$ as an exception to structures each violating the respective conventions, the administrator can set up a false detection pattern defining an exception to the convention violation. Specifically, if, for example, a tuple of the conversion rule $t_q$ and the piece $r_0$ of violation information is set up as an false detection pattern, the determination unit 140 is capable of determining that only the conversion tree $q_{i+1}$ does not violate the convention, and that the conversion tree $p_{j+1}$ violate the convention.

The setting of false detection patterns defining exceptions to the convention violation, whose examples have been described with reference to FIGS. 3b and 4, makes it possible to accurately check on programs each violating the respective conventions. In addition, this eases strictness required for the conversion rules and the violation information, and thus makes it easy to create the conversion rules and the violation information.

Figure 5:
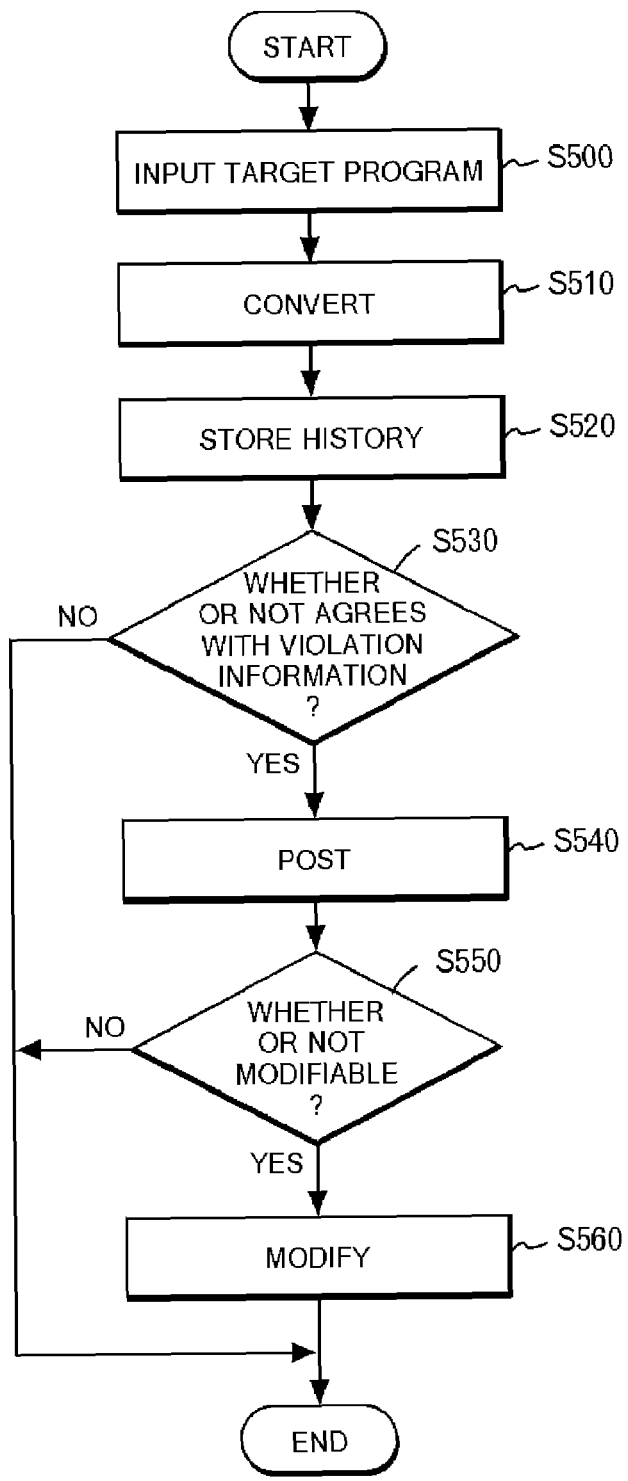
FIG. 5 shows a flow of a process for determining whether or not a target program violates a convention.

FIG. 5 shows a flow of a process for determining whether or not a target program violates a convention. The input unit 100 receives an input of a target program which is an object of a determination on whether to violate a convention (S500). Out of a plurality of conversion rules, the converter 110 selects a plurality of combinations each consisting of one or more conversion rules. Thus, the converter 110 sequentially applies each of the conversion rules in each of the combinations to abstract syntax trees of the target program, and thereby generates each of a plurality of conversion rules (S510). Each time one of the abstract syntax trees is converted by the converter 110, the history storing unit 120 stores a subtree of the pre-converted abstract syntax tree and a subtree of the post-converted conversion tree while associating the two subtrees with each other (S520).

The determination unit 140 determines whether or not at least a part of a structure of at least one of the plurality of generated conversion trees agrees with any one piece of violation information (S530). On condition that the part agrees with any one part of the violation information (S530: YES), the posting unit 150 informs a user that the target program violates a convention (S540). In addition, the positing unit 150 may inform the user of a modification method corresponding to the convention. Furthermore, the posting unit 150 may inform the user of a program expressed with a conversion tree with a structure not agreeing with any piece of the violation information stored in the violation storing unit 130, out of the conversion trees which have been obtained by the conversion by the converter 110. Moreover, preferably, the posing unit 150 may inform the user of a program which has a smallest number of nodes included in a corresponding conversion tree among the programs expressed with these conversion trees obtained by the conversion. Thereby, the user can learn a method of modifying the program violating the convention, and can further learn the simplest modification method.

As well, in this case, the correction unit 160 may determine whether or not the target program is capable of being automatically modified (S550). For example, on condition that the target program violates the convention, and on condition that the conversion of the abstract syntax tree indicating the target program to the informed conversion tree is an equivalent conversion, the correction unit 160 may determine that the target program is capable of being automatically modified. In addition, it is desirable that the target program should be automatically modified on condition that the user agrees to the automatic modification. On condition that the target program is capable of being automatically modified (S550: YES), the correction unit 160 corrects at least a part of the target program to a structure indicated by the informed conversion tree (S560). The corrected target program is outputted for the user.

Subsequently, descriptions will be provided for a specific example where the target program is detected as violating a convention, by use of FIGS. 6 and 7.

FIG. 6 shows an example of the target program. This target program is described with the SQL, and indicates a procedure for accessing the database. With regard to this example, descriptions will be provided for a method of determining whether to violate a convention, citing an example of a part from the third to the 12th lines of this target program. This part of the target program is expressed as a subtree $s_1$, in the abstract syntax tree of the target program. A part of the program from the 6th to the 7th lines indicates a process for left-joining a table COMPASHPROFILE to a table TM_CR_EMPLOYEE_INFO with a predetermined condition. Furthermore, the table generated by this left join is inner-joined to a table TM_CR_BO_PRESENT_INFO.

A part of the program from the third to fourth lines indicates a process for selecting a predetermined row or column from a table generated by this inner join. In addition, a part of the program from the twelfth to thirteenth lines indicates a process for further inner-joining the table generated by this selection to the table COMPASHRPROFILE.

Actually, the converter 110 sequentially applied the conversion rules $t_{aj}$ and $t_{mj}$ to the target program shown in FIG. 6, and thereby generated 19 conversion trees. Out of these conversion trees, some includes SQL sentences as follows.

COMPASHRPROFILE AS JT INNER JOIN COMPA-SHRPROFILE AS HR2
ON JT. USERID=HR2. USERID

Both of these SQL sentences access the table COMPA-SHRPROFILE with a single key USERID. For this reason, the abstract syntax tree of this target program agrees with a structure indicated by the piece r5 of violation information. As a result, it is determined that the target program shown in FIG. 6 violates the convention.

FIG. 7 shows an example of a program expressed with a conversion tree obtained by converting the abstract syntax tree of the target program. The program shown in FIG. 7 is a program generated by applying the aforementioned conversion rule $t_{mj}$ to a tuple of a SELECT command from the third to the fourth lines of FIG. 6 and an INNER JOIN command in the 12th lines of FIG. 6. In other words, in FIG. 6, the SELECT command is executed, and thereafter the INNER JOIN command is executed. In contrast, in FIG. 7, the INNER JOIN command is executed, and thereafter the SELECT command is executed.

In the case of the program shown in FIG. 7, in the 6th line, a table HR1 and a table EM are objects of join. In addition, in the 9th line, a table BO is an object of join. Moreover, in the 12th line, a table HR2 is an object of join.

Furthermore, the plurality of joining processes are consecutively carried out without executing the SELECT command. For this reason, it can be considered that the abstract syntax tree of this program may violate the piece ($r_3$) of violation information shown in FIG. 3a. However, the tuple of the piece ($r_3$) of violation information and the conversion rule $t_{mj}$ corresponds to one of the false detection patterns shown in FIG. 3b. As a result, the determination unit 140 does not determine that the target violates the convention, depending on conversion trees indicated by the program shown in FIG. 7.

Subtrees indicated by the part of the program from the 6th to the 12th lines of FIG. 7 are converted respectively to subtrees $S_2$ to $s_{19}$ with another conversion rule. In a case where, in this manner, a conversion tree which is falsely detected as violating the convention is further converted with a subsequent conversion rule, it has to be designed not to be determined that a result of the subsequent conversion violates the convention due to the conversion tree which has already been falsely detected. To this end, even in a case where a structure of the conversion tree obtained by the subsequent conversion agrees with the violation information, if a subtree to be converted by the subsequent conversion is the same as the subtree which has been falsely detected, the determination unit 140 continues treating the subtree to be converted by the subsequent conversion as being falsely detected. In other words, on further condition that the subtree to be converted by the subsequent conversion is different from the subtree which has been falsely detected, the determination unit 140 determines that the target program violates the convention. This conditional judgment is implemented by comparing the pre-converted conversion tree with the post-converted conversion tree, the trees being stored in the history storing unit 120. Specifically, in a case where, for example, a subtree once determined as a false detection pattern has not been converted by the subsequent conversion, the determination unit 140 does not determine that the target program violates the convention. Even in the case where the false detection pattern is once detected, this makes it possible to adequately check on the convention violation stemming from the conversion rule subsequently applied.

As have been illustrated in FIGS. 6 and 7, it was confirmed that the determination apparatus 10 according to this example adequately determined whether or not an actually-described program violated a convention set up by a project administrator or the like. In addition, time which it took to make this determination was shorter than one second. Thus, it was confirmed that it was a processing speed sufficient for the actual use.

Figure 8:
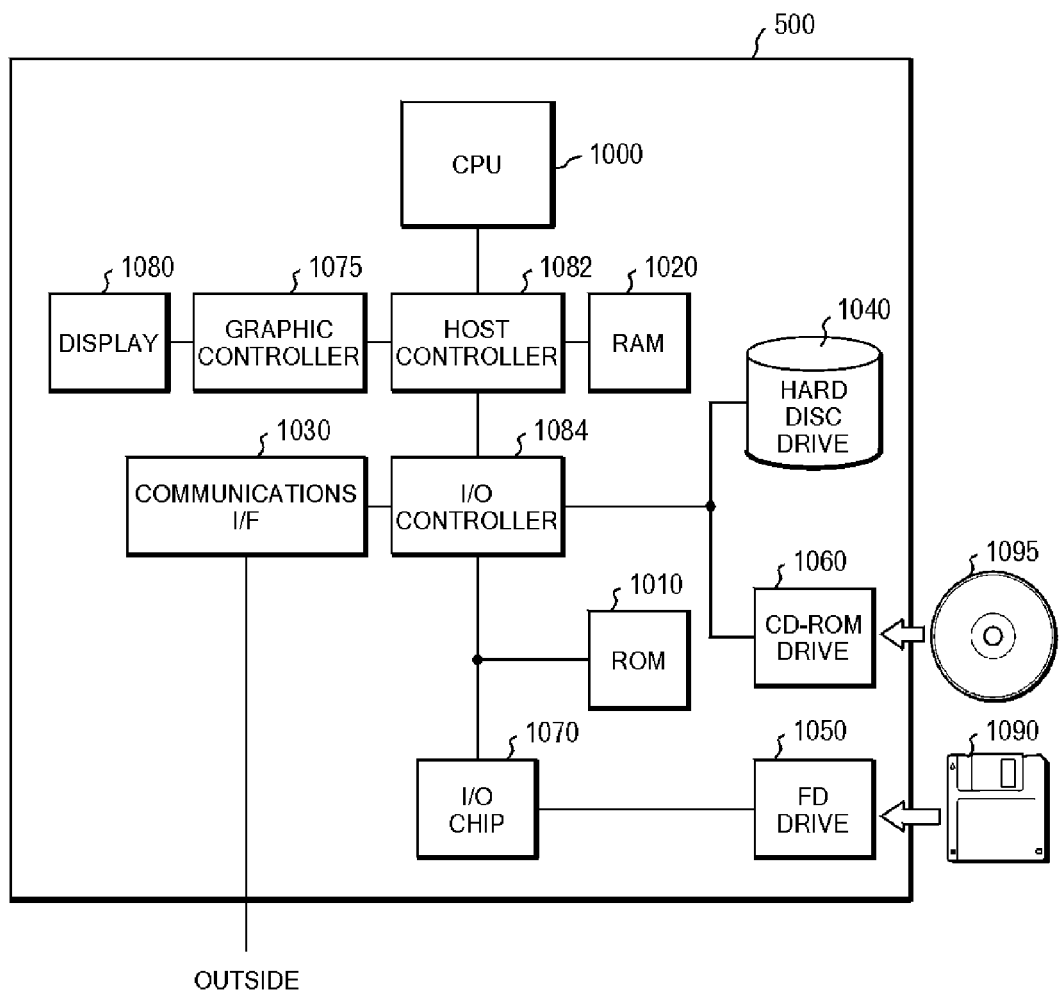
FIG. 8 shows an example of a hardware configuration of an information processing system 500 functioning as the determination apparatus 10.

FIG. 8 shows an example of a hardware configuration of an information processing system 500 functioning as the determination apparatus 10. The information processing system 500 includes a CPU peripheral section, an input/output section and a legacy input/output section. The CPU peripheral section includes a CPU 1000, a RAM 1020 and a graphic controller 1075 which are connected to one another through a host controller 1082. The input/output section includes a communications interface 1030, a hard disc drive 1040 and a CD-ROM drive 1060 which are connected to the host controller 1082 through an input/output controller 1084. The legacy input/output section includes a ROM 1010, a flexible disc drive 1050 and an input/out chip 1070 which are connected to the input/output controller 1084.

The host controller 1082 connects the RAM 1020 with the CPU 1000 and the graphic controller 1075 which access the RAM 1020 at a high transfer rate. The CPU 1000 operates, and controls each piece of the hardware, based on programs stored in the ROM 1010 and the RAM 1020. The graphic controller 1075 acquires image data which the CPU 1000 and the like generate on a frame buffer reserved in the RAM 1020, and causes the image data to be displayed on a display 1080. Instead of this, the graphic controller 1075 may include a flame buffer for storing the image data generated by the CPU 1000 and the like in the inside thereof.

The input/output controller 1084 connects the host controller 1082 with the communications interface 1030, the hard disc drive 1040 and the CD-ROM drive 1060, which are relatively-high-speed input/output units. The communications interface 1030 makes communications with an external unit through a network. The hard disc drive 1040 stores programs and data which are used by the information processing system 500. The CD-ROM drive 1060 reads programs or data from a CD-ROM 1095, and provides the programs or data to the RAM 1020 or the hard disc drive 1040.

Relatively-low-speed input/output units, such as the ROM 1010, the flexible disc drive 1050 and the input/output chip 1070, are connected to the input/output controller 1084. A boot program executed by the CPU 1000 when the information processing system 500 is initiated, programs depending on the hardware of the information processing system 500, and the like are stored in the ROM 1010. The flexible disc drive 1050 reads programs or data from the flexible disc 1090, and provides the programs or data to the RAM 1020 or the hard disc drive 1040 through the input/output chip 1070. The input/output chip 1070 is connected to the flexible disc 1090, and is connected to various input/output units through, for example, a parallel port, a serial port, a key board port, a mouse port and the like.

The programs to be provided to the information processing system 500 are stored in recording media, such as the flexible disc 1090, the CD-ROM 1095 and an IC card, and thus is provided by a user. The programs are read from the recording media through the input/output chip 1070 and/or the input/output controller 1084, and are installed in the information processing system 500. Thus, the programs are executed. The programs are, for example, determination programs according to the present invention. Operations which these determination programs cause the information processing system 500 to execute by working on the information processing system 500 are the same as the operations executed in the determination apparatus 10, which have been described with reference to FIGS. 1 to 7. For this reason, the descriptions for the operations will be omitted.

The programs above-described may be stored in external recording media. In addition to the flexible disc 1090 and the CD-COM 1095, optical recording media such as a DVD and a PD, magneto-optical recording media such as a MD, tape media, a semiconductor memory such as an IC card, and the like can be used as recording media. In addition, the programs may be provided to the information processing system 500 through the network by using a memory, such as a hard disc and a RAM, which are provided to a server system connected to a dedicated communications network and the Internet, as recording media.

The determination apparatus 10 according to this example makes it possible to efficiently determine whether or not a target program violates a convention, although it has been difficult to detect the convention violation. The convention violation to be checked on in this example includes not only a syntax error in a program but also a violation of a convention set up locally in a project for developing the program and a library in which the program is incorporated. If a program is checked on with such a convention and thus a program violating the convention is beforehand corrected, this makes it possible to effectively execute the program, and to accordingly improve efficiency in which software is developed and operated. Furthermore, by enabling exceptions to the convention violation, which are false detection patterns, to be set up, accuracy with which the convention violation is checked on can be enhanced, and conventions and conversion rules can be efficiently created. Moreover, in a case where a false detection pattern is once detected, a subtree agreeing with the pattern continues being determined as the false detection pattern. This makes it possible to adequately check on a convention violation caused by a conversion rule to be subsequently applied.

The present invention has been described by use of the embodiments. However, the technical scope of the present invention is not limited to the scope described with regard to the foregoing embodiments. It is clear to those skilled in this art that various modifications or improvements can be added to the foregoing embodiments. It is clear from the descriptions in the scope of claims that any embodiment obtained by adding such modifications or improvements is also included in the technical scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the spirit and scope of the invention defined in the appended claims.

That which is claimed is:

1. A method for determining a convention violation of a program on a computer comprising a violation storing unit for beforehand storing violation information indicating a structure of the program violating a convention for each of a plurality of conventions; and a conversion rule storing unit for storing a predetermined plurality of conversion rules, comprising steps of:

receiving an input of the program potentially violating the convention;

selecting one or more conversion rules;

sequentially applying the one or more of conversion rules into an abstract syntax tree of the program;

converting the abstract syntax tree into a plurality of conversion trees;

storing a pre-conversion sub-tree of the abstract syntax tree based on the abstract syntax tree prior to conversion into the plurality of conversion trees;

storing a post-conversion sub-tree of the abstract syntax tree based on the converted abstract syntax tree;

associating the pre-conversion sub-tree of the abstract syntax tree with the post-conversion sub-tree of the abstract syntax tree;

determining that the program violates the convention on condition that at least part of a structure is common between the pre-conversion and post-conversion sub-trees, and that the common part of the structure satisfies any of the violation information stored in the violation storing unit; and informing a user of the program that the program violates the convention.

* * * * *